Figure 3:
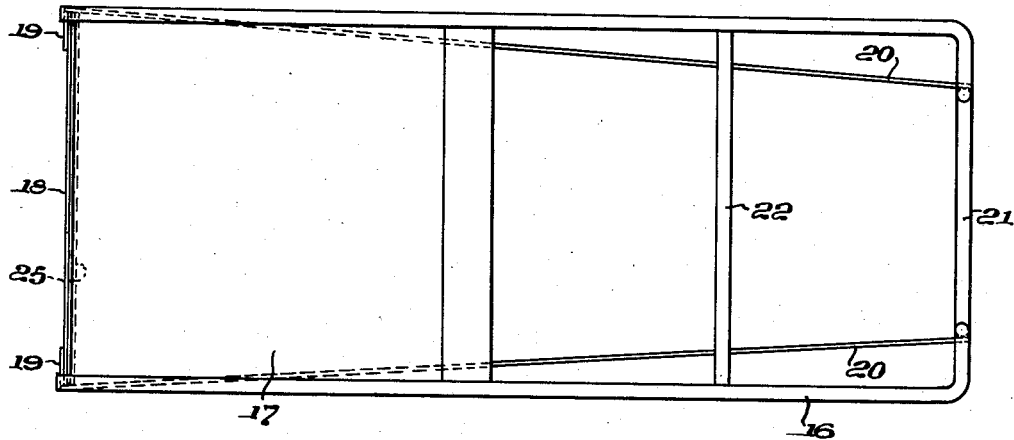

Oct. 12, 1954
J. M. LEWIS ET AL
2,691,427
DUST FILTERING APPARATUS
Filed Dec. 16, 1950
2 Sheets-Sheet 1
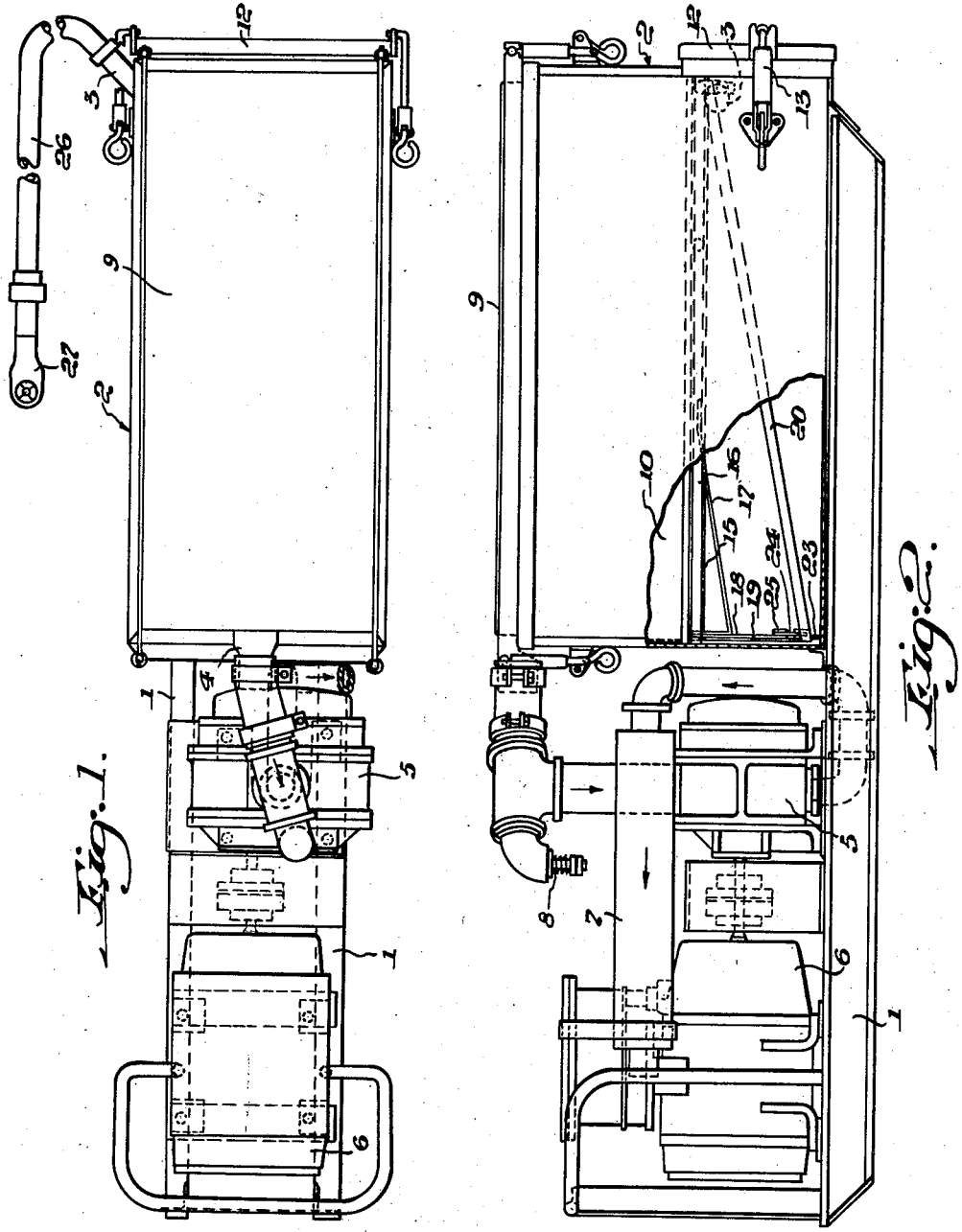
INVENTORS
John M. Lewis
Robert A. Bub
BY
Brown, Critchlow, Flick & Peckham
their ATTORNEYS.

Oct. 12, 1954    J. M. LEWIS ET AL    2,691,427
DUST FILTERING APPARATUS
Filed Dec. 16, 1950                    2 Sheets-Sheet 2

INVENTORS
John M. Lewis
Robert A. Bub
BY
Brown, Critchlow, Flick & Peckham
their ATTORNEYS.

Patented Oct. 12, 1954

2,691,427

UNITED STATES PATENT OFFICE 2,691,427

DUST FILTERING APPARATUS

John M. Lewis, Cheswick, and Robert A. Bub, Wilkinsburg, Pa., assignors to Mine Safety Appliances Company, Pittsburgh, Pa., a corporation of Pennsylvania Application December 16, 1950, Serial No. 201,154

7 Claims. (Cl. 183—67)

This invention relates to apparatus for filtering dust from air and returning dust-free air to the working area.

In some dust filtering operations, the dust is so concentrated in the air and much of it is of such large particle size that sheets of filtering material will soon become abraded and damaged and require replacement. This can occur so often that it becomes a nuisance and seriously interferes with the work being performed. For example, in drilling holes up into the roofs of mine passages for receiving roof bolts, a great deal of rock dust is formed which should be trapped by filtering apparatus. In ordinary filtering apparatus, where air is drawn through the filtering material by suction, the tendency is for the air to "channel" and concentrate the dust particles in one portion of the filtering material until that portion is blocked, while little air passes through the rest of the material.

It is among the objects of this invention to provide filtering apparatus which can operate for relatively long periods of time under adverse dust conditions without attention, in which a large part of the dust is collected before it reaches the filtering material in the apparatus, in which objectionable channeling does not occur, and in which there is considerable turbulence of the dust-laden air.

In accordance with this invention a housing contains suitable filtering material, such as a sheet or sheets of filter cloth, which is spaced a considerable distance from the bottom of the housing. The housing has an inlet at one end for dust-laden air that is drawn into the housing below the filtering material, and at the opposite end it has an outlet above the material for filtered air. Preferably, the inlet is near one corner of the housing and directs the incoming stream of air diagonally across the housing against its opposite side wall. Below the filtering material there is an air deflecting plate which extends across the housing and from the central portion of the housing downward away from the inlet end. This plate is in the path of dust-laden air flowing lengthwise of the housing from its inlet, and causes considerable turbulence of the air so that much of the air flows up through the filtering material between the plate and the inlet. The deflecting plate intercepts and knocks heavy dust particles in the air down onto the floor of the housing. There are air passages at the opposite side edges of the plate to permit air with the dust remaining in it to flow upward to the filtering material above the plate. A considerable amount of the dust is removed by the deflecting plate from the air before it reaches the filtering material. One end of the housing is provided with a clean-out opening below the filtering material, and a scraper is disposed in the housing where it is adapted to be moved along the housing floor toward the clean-out opening to remove dust that has accumulated on the floor. Preferably, the scraper is hinged to permit it to swing toward the clean-out opening when the scraper is pushed away from it so that the scraper will pass over any dust remaining on the housing floor. The most suitable arrangement is for the scraper and deflecting plate to be carried by the same support, such as a frame which slides in and out of the housing on ledges extending along the opposite sides of the housing.

Figure 4:
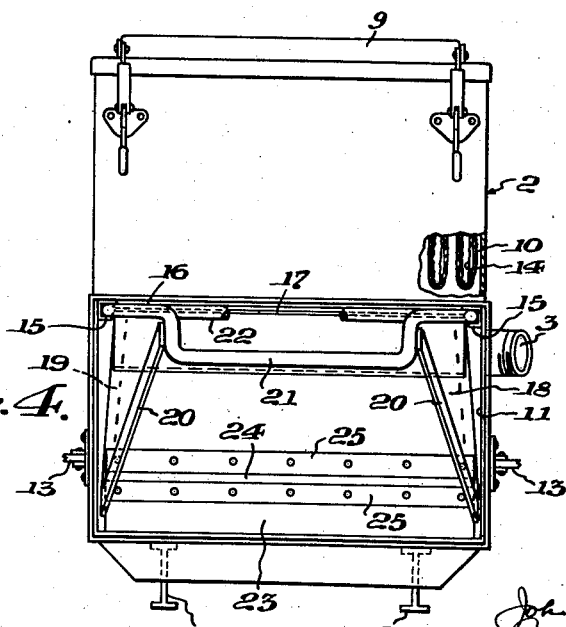

The preferred embodiment of the invention is illustrated in the accompanying drawings, in which Fig. 1 is a plan view of my dust filtering apparatus; Fig. 2 is a side view with a portion of the filter housing broken away to show the interior; Fig. 3 is an enlarged plan view of the deflecting plate and its supporting frame; and Fig. 4 is an enlarged view of the back end of the apparatus with the clean-out door removed and with a piece broken away to show a portion of the filtering material in section.

The filtering apparatus disclosed herein preferably is portable, so it is mounted on a frame formed from a pair of spaced horizontal beams 1. These beams may be carried by wheels (not shown) by which the apparatus can be transported to the desired locations. Mounted on the rear half of the frame is a box-like filter housing 2, which is provided near the rear end of one side with an inlet coupling 3 that preferably extends diagonally away from the housing. At the top of the opposite end of the housing there is an outlet coupling 4, which is connected to a suction blower 5 operated by an electric motor 6 on the front end of the frame. The outlet of the blower may be connected to a silencer 7. In the inlet pipe of the blower there is a relief valve 8 that will open in case the resistance to passage of air through the apparatus becomes too great. The outlet coupling 4 most suitably is connected to the front end of the removable cover 9 of the housing. Mounted in the upper half of the housing is dust filtering material 10. As this material does not form any part of the invention claimed herein, it will not be described any further than to say that it preferably is sheet-like material provided with depending pockets, that are held open in any suitable manner, such as by chicken wire 14 inside the pockets. Air that has been filtered in passing through the filtering material is drawn into the housing cover. The back end of the housing has a clean-out opening 11 (Fig. 4) extending from the bottom of the filtering material to the bottom of the housing and entirely across the housing. This opening normally is sealed shut by a door 12 held in place by spring latches 13.

Extending along the inner surfaces of the opposite sides of the housing near the top of the clean-out opening is a pair of horizontal ledges 15 for slidably supporting an open horizontal frame 16. The air inlet to the housing is directly below one of the ledges. As shown in Fig. 3, extending across the front half of the open frame 16 is an air deflecting plate 17. The rear end of this plate is secured to the opposite sides of the frame, and the plate then is inclined downward and forward toward the front end of the housing. It has been found that an inclination of about 8 or 10 degrees is the most suitable. The front end portion of the inclined plate is bent upward and engages a vertical plate 18 that extends across the front end of the frame. The vertical plate extends downward from the frame and is secured to a pair of vertical metal bars 19 depending from the front end of the frame. The lower ends of the bars are braced by inclined straps 20 connected to the rear end of the frame, which has a downwardly bent portion 21 to form a handle. About half way between the handle and the deflecting plate a reinforcing bar 22 extends across the frame. As shown in Fig. 4, the deflecting plate 17 is not quite as wide as the housing, so air passages are left between the opposite side edges of the plate and the adjacent side walls of the housing. These air passages are baffled by ledges 15 above them. The vertical end plate 18 does not extend downward as far as the lower ends of the vertical bars 19, but it is provided with a long hinge which connects its lower edge to a narrow scraper plate 23 that extends below the bars far enough to substantially engage the floor of the housing. The hinge preferably is formed from a strip of rubber 24 clamped against the adjoining plates by means of vertically spaced metal strips 25.

The blower 6 draws dust-laden air at high velocity into the lower part of the housing through inlet coupling 3 from a flexible hose 26 connected to a nozzle 27 that collects the dust, such as from a mine roof bolt hole while it is being drilled. The stream of entering air flows diagonally forward across the housing and impinges against its side wall, where some of the heavier dust particles are arrested and fall down onto the floor of the housing. The stream of air is deflected from the side wall and spread out, and it flows forward against the inclined deflecting plate 17. This plate likewise knocks some of the heavier dust particles down onto the floor of the housing, and it also deflects the air downward and back toward the rear of the housing. This, together with the flow of air back and forth across the housing, creates considerable turbulence so that much of the air flows up through the filtering material 10 behind the rear edge of the deflecting plate. The rest of the air, with the smaller dust particles remaining in it, flows upward between the opposite side edges of the deflecting plate and the housing side walls to the filtering material above. Consequently, the full length and width of the filtering material is used all of the time, without channeling. Turbulence, buffeting, baffling and reduced velocity combine to remove the majority of the large dust particles before they can reach the filtering material. The filtering material filters the dust from the air passage through it so that substantially dust-free air issues from the filter and is drawn out of the outlet at the front end of the housing cover.

At periodic intervals the door 12 at the back of the housing is removed and frame 16 is pulled out of the clean-out opening. When the frame is pushed back into the housing the hinged scraper plate 23 will swing upward and pass over any little piles of dust that may remain on the housing floor. Since the housing side wall and the inclined deflecting plate 17 remove a great deal of dust from the air before it reaches the filtering material in the upper half of the housing, that material will function much longer than usual without attention. It requires only a moment to clean out the bottom part of the housing by means of the scraper, and that need not be done until that bottom part is substantially full of dust.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Dust filtering apparatus comprising a housing, filtering material in the housing spaced from the bottom thereof, the housing having an inlet at one end for dust-laden air below said material and having an outlet at the opposite end above said material for filtered air, and an air deflecting plate below said material extending across the housing and from the central portion of the housing downward away from said inlet end to said opposite end in the path of dust-laden air flowing lengthwise of the housing from its inlet, whereby to create turbulence and to knock heavy dust particles in the air down onto the bottom of the housing, there being air passages extending along the entire length of the opposite side edges of the plate to permit some of the air to flow upward to the filtering material above the plate, and the filtering material between said plate and inlet end of the housing being exposed to said dust-laden air.

2. Dust filtering apparatus comprising a housing, filtering material in the housing spaced from the bottom thereof, the housing having an inlet at one end for directing dust-laden air diagonally across the housing below said material, the housing having an outlet at its opposite end above said material for filtered air, and an air deflecting plate below said material extending across the housing and inclined from the central portion of the housing downward away from said inlet end to said opposite end in the path of dust-laden air flowing lengthwise of the housing from its inlet, whereby to create turbulence and to knock heavy dust particles in the air down onto the bottom of the housing, the opposite side edges of the plate being spaced throughout their length a short distance from the adjacent sides of the housing to permit some of the air to flow upward past the plate to the filtering material, and the filtering material between said plate and inlet end of the housing being exposed to said dust-laden air.

3. Dust filtering apparatus comprising a housing, filtering material in the housing spaced from the bottom thereof, the housing having an inlet at one end for dust-laden air below said material and having an outlet at its opposite end above said material for filtered air, an air deflecting plate below said material extending across the housing and from the central portion of the housing downward away from said inlet end in the path of dust-laden air flowing lengthwise of the housing from its inlet, whereby to create turbulence and to knock heavy dust particles in the air down onto the bottom of the housing, the opposite side edges of the plate being spaced a short distance from the adjacent sides of the housing to permit some of the air to flow upward past the plate to the filtering material, a scraper in the housing normally substantially engaging the bottom of the housing at one end, the other end of the housing being provided with a clean-out opening below the filtering material, and means for moving the scraper along the housing bottom toward said opening to remove dust from the housing.

4. Dust filtering apparatus comprising a housing, filtering material in the housing spaced from the bottom thereof, the housing having an inlet at one end for dust-laden air below said material and having an outlet at its opposite end above said material for filtered air, an air deflecting plate below said material extending across the housing and from the central portion of the housing downward away from said inlet end in the path of dust-laden air flowing lengthwise of the housing from its inlet, whereby to create turbulence and to knock heavy dust particles in the air down onto the bottom of the housing, the opposite side edges of the plate being spaced a short distance from the adjacent sides of the housing to permit some of the air to flow upward past the plate to the filtering material, a scraper in the housing normally substantially engaging the bottom of the housing at one end, the other end of the housing being provided with a clean-out opening below the filtering material, means for moving the scraper along the housing bottom toward said opening to remove dust from the housing, and a hinge connecting the scraper to said means to permit the scraper to swing toward said opening to pass over any dust on the housing bottom when the scraper is moved away from said opening.

5. Dust filtering apparatus comprising a housing, filtering material in the housing spaced from the bottom thereof, the housing having an inlet at one end for dust-laden air below said material and having an outlet at its opposite end above said material for filtered air, an air deflecting plate below said material extending across the housing and from the central portion of the housing downward away from said inlet end in the path of dust-laden air flowing lengthwise of the housing from its inlet, whereby to create turbulence and to knock heavy dust particles in the air down onto the bottom of the housing, the opposite side edges of the plate being spaced a short distance from the adjacent sides of the housing to permit some of the air to flow upward past the plate to the filtering material, the inlet end of the housing being provided with a clean-out opening below the filtering material, a supporting member for the plate movable lengthwise of the housing through said opening, and a scraper connected to the end of said member adjacent said plate and substantially engaging the bottom of the housing, whereby the scraper can be pulled by said member toward said opening to remove dust from the housing.

6. Dust filtering apparatus comprising a housing, filtering material in the housing spaced from the bottom thereof, the housing having an inlet at one end for dust-laden air below said material and having an outlet at its opposite end above said material for filtered air, horizontal ledges mounted on opposite sides of the housing directly below the filtering material, one end of the housing being provided with a clean-out opening extending from above said ledges to the bottom of the housing, an open frame mounted on the ledges and slidable out of said opening, and an air deflecting plate carried by said frame and inclined from the central portion of the housing downward away from said inlet end in the path of dust-laden air flowing lengthwise of the housing from its inlet, whereby to create turbulence and to knock heavy dust particles in the air down onto the bottom of the housing, the opposite side edges of the plate being spaced a short distance from the adjacent sides of the housing to permit some of the air to flow upward past the plate to the filtering material.

7. Dust filtering apparatus comprising a housing, filtering material in the housing spaced from the bottom thereof, the housing having an inlet at one end for dust-laden air below said material and having an outlet at the opposite end above said material for filtered air, horizontal ledges mounted on opposite sides of the housing directly below the filtering material, the end of the housing adjacent said inlet being provided with a normally closed clean-out opening extending from above said ledges to the bottom of the housing, an open frame mounted on the ledges and slidable out of said opening, an air deflecting plate carried by said frame and inclined from the central portion of the housing downward toward said opposite end in the path of dust-laden air flowing lengthwise of the housing from its inlet, two superimposed vertical plates carried by said frame at said opposite end of the housing with the lower plate substantially engaging the bottom of the housing to form a scraper, hinging means connecting the two vertical plates together and permitting the lower plate to swing toward said clean-out opening, whereby said lower plate can swing upward to pass over any dust on the housing bottom when the scraper is moved away from said opening by means of the frame.

References Cited in the file of this patent

UNITED STATES PATENTS

| Number | Name | Date |
|---|---|---|
| 403,704 | Stuart | May 21, 1889 |
| 1,593,221 | Ranyard | July 20, 1926 |
| 1,743,934 | Ruemelin | Jan. 14, 1930 |
| 2,226,630 | McCord | Dec. 31, 1940 |